United States Patent
Hartke et al.

(10) Patent No.: US 6,367,319 B2
(45) Date of Patent: Apr. 9, 2002

(54) METHOD OF CONTROLLING AN INTERNAL COMBUSTION ENGINE IN DEPENDENCE ON AN EXHAUST GAS PRESSURE

(75) Inventors: Andreas Hartke, München; Achim Koch, Tegernheim, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/817,595

(22) Filed: Mar. 26, 2001

Related U.S. Application Data

(63) Continuation of application No. PCT/DE99/03005, filed on Sep. 20, 1999.

(30) Foreign Application Priority Data

Sep. 25, 1998 (DE) ......................................... 198 44 085

(51) Int. Cl.$^7$ ............................................. G01M 15/00
(52) U.S. Cl. ................................................. 73/117.3
(58) Field of Search ........................ 73/115, 116, 117.2, 73/117.3, 118.1

(56) References Cited

U.S. PATENT DOCUMENTS

| | | | |
|---|---|---|---|
| 4,453,379 A | | 6/1984 | Kawamura et al. |
| 4,722,315 A | | 2/1988 | Pickel |
| 5,033,290 A | * | 7/1991 | Seki et al. ............ 73/118.1 |
| 5,140,850 A | * | 8/1992 | Ellmann et al. ......... 73/118.2 |
| 5,205,260 A | | 4/1993 | Takahashi et al. |
| 5,270,935 A | | 12/1993 | Dudet et al. |
| 5,309,756 A | * | 5/1994 | Osawa et al. .......... 73/116 |
| 5,392,642 A | * | 2/1995 | Tao ................... 73/117.3 |
| 5,417,109 A | * | 5/1995 | Scourtes ............... 73/116 |
| 5,590,632 A | * | 1/1997 | Kato et al. |
| 5,635,634 A | * | 6/1997 | Reuschenbach et al. ... 73/118.2 |

FOREIGN PATENT DOCUMENTS

| | | |
|---|---|---|
| DE | 195 08 505 C2 | 8/1998 |
| EP | 0 397 360 B1 | 12/1993 |

OTHER PUBLICATIONS

Published International Application No. WO 97/35106 (Treinies et al.), dated Sep. 25, 1997, as mentioned on p. 1 of the specification.

\* cited by examiner

*Primary Examiner*—Eric S. McCall
(74) *Attorney, Agent, or Firm*—Herbert L. Lerner; Laurence A. Greenberg; Werner H. Stemer

(57) ABSTRACT

An internal combustion engine has an intake tract, at least one cylinder, an exhaust gas tract and inlet and outlet valves, which are assigned to the cylinder. An exhaust gas pressure in the cylinder is determined during the valve overlap of the inlet and outlet valves as a function of an estimated value of an exhaust gas pressure, which is effected by the combustion of an air/fuel mixture in the cylinder, and a variable which characterizes the centroid of the valve overlap of the inlet and outlet valves. At least one actuating signal for controlling an actuator of the internal combustion engine is derived from the exhaust gas pressure, or the internal combustion engine is monitored as a function of the exhaust gas pressure.

11 Claims, 4 Drawing Sheets

METHOD OF CONTROLLING AN INTERNAL COMBUSTION ENGINE IN DEPENDENCE ON AN EXHAUST GAS PRESSURE

CROSS-REFERENCE TO RELATED APPLICATION

This application is a continuation of copending International Application No. PCT/DE99/03005, filed Sep. 20, 1999, which designated the United States.

BACKGROUND OF THE INVENTION

Field of the Invention

The invention lies in the field of internal combustion engine technology. More specifically, the invention relates to a method for controlling an internal combustion engine as a function of an exhaust gas pressure, in particular an internal combustion engine which has servo-drives for setting the load on the internal combustion engine, which act on the gas exchange valves of the cylinders of the internal combustion engine.

Commonly assigned U.S. Pat. No. 5,974,870 (see international PCT publication WO 97/35106) discloses a method for controlling an internal combustion engine in the case of which an intake pipe pressure and a gas mass flow into a cylinder of the internal combustion engine are determined. A dynamic model is provided for this purpose of the intake tract of the internal combustion engine and of an external exhaust gas recirculation via a pipe which is guided away from an exhaust gas tract to the intake tract of the internal combustion engine and in which an exhaust gas recirculation valve is arranged. The dynamic model is derived from equations for the mass flow balances in the intake tract and from the flow equations of ideal gases at throttle points. The measured variables of speed and degree of opening of the throttle valve are input variables of the dynamic model. An exhaust gas pressure in the exhaust gas tract is also determined for the purpose of calculating the mass flow at the exhaust gas recirculation valve. This is performed by using a characteristic diagram for parameterization as a function of operating point, or by evaluating the signals of appropriate sensors.

SUMMARY OF THE INVENTION

The object of the present invention is to provide a method of controlling an internal combustion engine which overcomes the above-noted deficiencies and disadvantages of the prior art devices and methods of this general kind, and which is precise and simple even in the case of internal exhaust gas recirculation.

With the above and other objects in view there is provided, in accordance with the invention, a method of controlling an internal combustion engine in dependence on an exhaust gas pressure, the internal combustion engine including an intake tract, at least one cylinder, an exhaust gas tract, inlet and outlet valves disposed at the cylinder and driven, in particular, with electromechanical servo-drives. The method comprises the following steps:

determining an exhaust gas pressure in the cylinder during a valve overlap of the inlet and outlet valves that causes an internal exhaust gas recirculation in dependence on an estimated value of an exhaust gas pressure effected by a combustion of an air/fuel mixture in the cylinder, and a variable characterizing a centroid of the valve overlap of the inlet and outlet valves, and thereby defining the centroid with reference to a surface produced by the overlapping valve strokes of the inlet and outlet valves referred to a crankshaft angle.

The valve overlap is the range of the crankshaft angle in which both the inlet valve and the outlet valve expose at least a part of their flow cross sections at the inlet and outlet ports of the cylinder. At least one actuating signal for controlling an actuator of the internal combustion engine is derived from an exhaust gas pressure, or the internal combustion engine is monitored as a function of the exhaust gas pressure.

In accordance with an added feature of the invention, the estimated value of the exhaust gas pressure effected by the combustion of the air/fuel mixture in the cylinder depends on a gas mass flow into the cylinder.

In accordance with an additional feature of the invention, the variable characterizing the centroid of the valve overlap of the inlet and outlet valves is a center of gravity angle of the centroid of the valve overlap referred to the crankshaft angle.

In accordance with another feature of the invention, the center of gravity angle is a function of a closing angle of the outlet valve, of an angle segment of the valve overlap and of a prescribed correction value.

In accordance with a further feature of the invention, the correction value is defined in dependence on a variable influencing a closing rate or an opening rate of the inlet or outlet valves.

In accordance with again an added feature of the invention, a mass flow resulting from internal exhaust gas recirculation is determined as a function of the exhaust gas pressure and an intake pipe pressure in the intake tract.

In accordance with again an additional feature of the invention, the mass flow resulting from internal exhaust gas recirculation is determined as a function of a mean flow cross section at the inlet valve of the cylinder during the valve overlap.

In accordance with again another feature of the invention, the mean flow cross section is a function of the angle segment of the valve overlap.

In accordance with again a further feature of the invention, the mass flow into the cylinder is determined with a dynamic model of the internal combustion engine as a function of the mass flow resulting from internal exhaust gas recirculation, and of at least the measured variables of the degree of opening of a throttle valve in the intake tract and of a speed of the crankshaft.

In accordance with a concomitant feature of the invention, the exhaust gas pressure depends on an ambient pressure.

Other features which are considered as characteristic for the invention are set forth in the appended claims.

Although the invention is illustrated and described herein as embodied in a method for controlling an internal combustion engine as a function of an exhaust gas pressure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
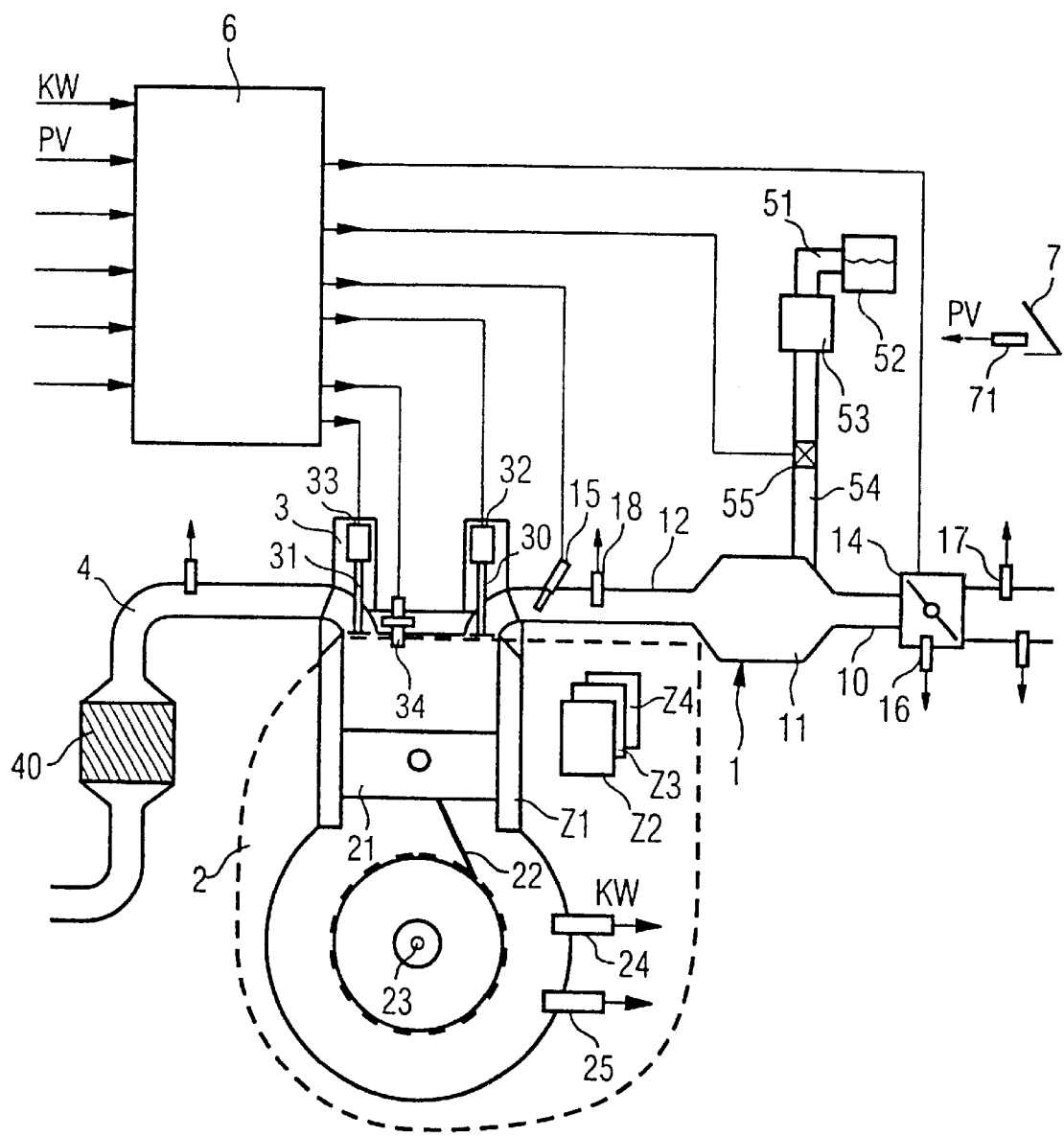
FIG. 1 is a diagram of an internal combustion engine.

Referring now to the figures of the drawing in detail and first, particularly, to FIG. 1 thereof, the internal combustion engine comprises an intake tract 1 having an intake stub 10, a manifold 11, and an inlet port 12. The internal combustion engine also comprises an engine block 2, which has the cylinder Z1 and a crankshaft 23. A piston 21 and a connecting rod 22 are assigned to the cylinder Z1. The connecting rod 22 is connected between the piston 21 and the crankshaft 23. A cylinder head 3 is provided in which a valve mechanism is arranged which has at least one inlet valve 30 and one outlet valve 31. A valve mechanism 32, 33 is assigned to each of the gas exchange valves, which are designed as inlet valve 30 and as outlet valve 31. The valve mechanisms 32, 33 control the stroke start, the duration of the stroke and thus the stroke end and, if appropriate, the stroke amplitude of the respective gas exchange valve. The valve mechanisms 32, 33 are preferably implemented as electromechanical servo-drives having at least one electromagnet and an armature with an armature plate which can move between a first seating surface of the electromagnet and a further seating surface and which forms a spring-mass vibrator with at least one restoring means. The gas exchange valve is brought into an open position or a closed position by appropriately supplying or not supplying a coil of the electromagnet with current. The valve mechanisms 32, 33 can also be implemented in an electro-hydraulic fashion, or can be designed in another way—as appropriately chosen by those skilled in the art—so as to ensure that the servo-drive responds sufficiently to adjust the load. An injection valve 15 is arranged in the intake tract 1, in the inlet port 12. Furthermore, a spark plug is inserted in the cylinder head 3. The injection valve 15 can alternatively also be disposed in the cylinder head 3 in such a way that the fuel is metered directly in the combustion chamber of the cylinder Z1.

In addition to the cylinder Z1, the internal combustion engine also comprises further cylinders Z2, Z3 and Z4, which are correspondingly assigned an inlet valve and an outlet valve, valve mechanisms, injection valves, and spark plugs.

An exhaust gas tract 4 having a catalytic converter 40 and an oxygen probe is assigned to the internal combustion engine. Also provided is a tank ventilation device having a first tube 51, which is connected via a fuel tank 52 to an activated-carbon filter 53, which absorbs and desorbs fuel vapors. The activated-carbon filter 53 is connected to the manifold 11 via a second pipe 54. A tank ventilation valve 55 is arranged in the second pipe 54 and is driven by stipulating a pulse duty factor $TV_{TEV}$.

A control device 6 is provided which is assigned sensors that detect the various measured variables and respectively determine the measured value of the measured variable. As a function of at least one measured variable, the control device 6 determines actuating signals for controlling the valve mechanisms 32, 33, the injection valve 15, the spark plug 34, and the tank ventilation valve 55.

The sensors are a pedal position sensor 71, which detects a pedal position PV of the gas pedal 7, a position sensor 16 which detects a degree of opening $\alpha_{DK}$ of the throttle valve 14, an air mass meter 17 which detects an air mass flow $\dot{m}_L$, a first 1 temperature sensor 18 which detects a temperature $T_{L1}$ of the gas mixture taken in by the cylinder Z1, a crankshaft angle sensor 24 which detects a crankshaft angle KW, from whose temporal profile a speed N of the crankshaft 23 is calculated in the control device 6, and a second temperature sensor 25 which detects a coolant temperature $T_{cool}$. Depending on the embodiment of the invention, there can be any desired subset of said sensors, or else additional sensors. The first temperature sensor 18 can also be arranged, for example, upstream of the throttle valve 14.

The control device 6 is preferably designed as an electronic engine management unit. It can, however, also comprise a plurality of control units which are interconnected in an electrically conducting fashion, for example via a bus system.

A physical model of the internal combustion engine is stored in the control device 6 and is processed by the latter. An intake pipe pressure $p_s$ in the intake tract and a gas mass flow $\dot{m}_{zyl}$ in the cylinder Z1 are calculated by means of this model. The dynamic model is explained below. The following differential equation can be set up for the intake pipe pressure $p_s$ from the equation of state of ideal gases, that is to say the mass flow balance:

$$\dot{p}_S = \frac{RT_{L,1}}{V_S}(\dot{m}_{DK} + \dot{m}_{TEV} + \dot{m}_{AGR} - \dot{m}_{zyl}) \tag{F1}$$

Here, R denotes the general gas constant, $V_s$ denotes the volume of the intake tract downstream of the throttle valve 14, $T_{L,1}$ denotes the temperature of the gas mixture taken in by the cylinder, $\dot{m}_{DK}$ denotes the air mass flow at the throttle valve, $\dot{m}_{TEV}$ denotes the mass flow at the tank ventilation valve 55, $\dot{m}_{AGR}$ denotes the mass flow resulting from internal exhaust gas recirculation, and $\dot{m}_{zyl}$ denotes the gas mass flow into the cylinder Z1.

An approach using trapezoidal integration is adopted for a time-discrete illustration of the relationship (F1). Alternatively, however, it is also possible to use any desired other time-discrete integration method such as, for example, the Euler method. An index i in each case marks the value of the respective variable in the current calculation cycle, an index i−1 in each case marks the value of the respective variable from the preceding calculation cycle.

The following relationship is yielded for the intake pipe pressure $p_{s,i}$ in the current calculating cycle with the aid of the trapezoidal integration approach:

$$p_{s,i} = p_{s,i-1} + \frac{t_A}{2}(\dot{p}_{s,i-1} + \dot{p}_{s,i}) \tag{F2}$$

where $\dot{p}_s$ is the time derivative of the intake pipe pressure, and $t_A$ is the sampling time, that is to say the duration from a start of a calculating cycle up to the start of the next calculating cycle.

The segment time $t_{SEG}$ is given by $$t_{SEG} = \frac{1}{N \cdot Z} \tag{F3}$$

where Z is the number of cylinders and N the speed. The segment time $t_{SEG}$ is preferably prescribed for the sampling time $t_A$.

Substituting the relationship (F1) in (F2) yields $$p_{S,i} = p_{S,i-1} + \frac{t_A}{2}\dot{p}_{S,i-1} + \frac{t_A}{2}\frac{RT_{L,1}}{V_S}(\dot{m}_{DK} + \dot{m}_{TEV} + \dot{m}_{AGR} - \dot{m}_{zyl}) \quad (F4)$$

The air mass flow $\dot{m}_{DK}$ at the throttle valve 14 is derived from the flow equation of ideal gases through throttle points. It therefore holds that $$\dot{m}_{DK} = A_{DK}\sqrt{\frac{2\kappa}{\kappa-1}\frac{1}{RT_{L,0}}}\psi_{DK}p_0 \quad (F5)$$

where $$\sqrt{\left(\frac{p_{Sj}}{p_0}\right)^{\frac{2}{\kappa}} - \left(\frac{p_{Sj}}{p_0}\right)^{\frac{\kappa+1}{\kappa}}} \quad (F6)$$

for subcritical pressure ratios, and $$\sqrt{p_{q,krit}^{\frac{2}{\kappa}} - p_{q,krit}^{\frac{\kappa+1}{\kappa}}} \quad (F7)$$

for critical pressure ratios. The term $A_{DK}$ in (F5) denotes the flow cross section at the throttle valve 14, $\kappa$ denotes the adiabatic exponent (a value of $\kappa$ is, for example, 1.4), $\psi_{DK}$ denotes the flow function for the throttle valve, $p_0$ denotes the ambient pressure and $p_{q,krit}$ denotes a critical pressure ratio between the intake pipe pressure $p_s$ and the ambient pressure $p_0$ (for example $p_{q,krit}=0.52$).

It holds for the mass flow $\dot{m}_{TEV}$ at the tank ventilation valve 55 that:

$$\dot{m}_{TEV} = A_{TEV}\sqrt{\frac{2\kappa}{\kappa-1}\frac{1}{RT_{L,0}}}\psi_{TEV}p_0 \quad (F8)$$

where $A_{TEV}$ is the flow cross section at the tank ventilation valve 55, and $\psi_{TEV}$ is the flow function for the tank ventilation valve 55.

If an electromechanical valve mechanism 32, 33 is used by preference, appropriate functions in the control device 6 ensure that component tolerances in the valve mechanisms 32, 33 are compensated with a quality sufficient to enable the gas mass flow $\dot{m}_{zyl}$ taken in by the cylinder Z1 to be determined as a function of a desired mass flow $\dot{V}_{zyl}$ into the cylinder Z1. This yields the relationship $$\dot{m}_{zyl} = \dot{V}_{zyl}\frac{p_s}{RT_{L,1}} \quad (F9)$$

Internal exhaust gas recirculation is performed by appropriate adjustment of the valve overlap, which is defined as the range of the crankshaft angle KW in which both the inlet valve 30 and the outlet valve 31 expose at least a part of their flow cross sections at the inlet and outlet ports of the cylinder. In the case of internal exhaust gas recirculation, a portion of the exhaust gas flows back into the intake tract 1 and is then taken into the combustion chamber of the cylinder Z1 again in the following intake cycle. If there is a pressure gradient from the exhaust gas tract 4 to the cylinder Z1 and, furthermore, to the intake tract 1, exhaust gas also flows from the exhaust gas tract 4 back into the cylinder Z1, and from there into the intake tract 1.

The mass flow $\dot{m}_{AGR}$ resulting from internal exhaust gas recirculation depends essentially on an angle segment $\phi_{VUE}$ of the valve overlap, which is referred to the crankshaft angle KW, and in which both the inlet valve 30 and the outlet valve 31 expose at least a part of their flow cross sections at the inlet and outlet ports of the cylinder Z1.

Figure 2:
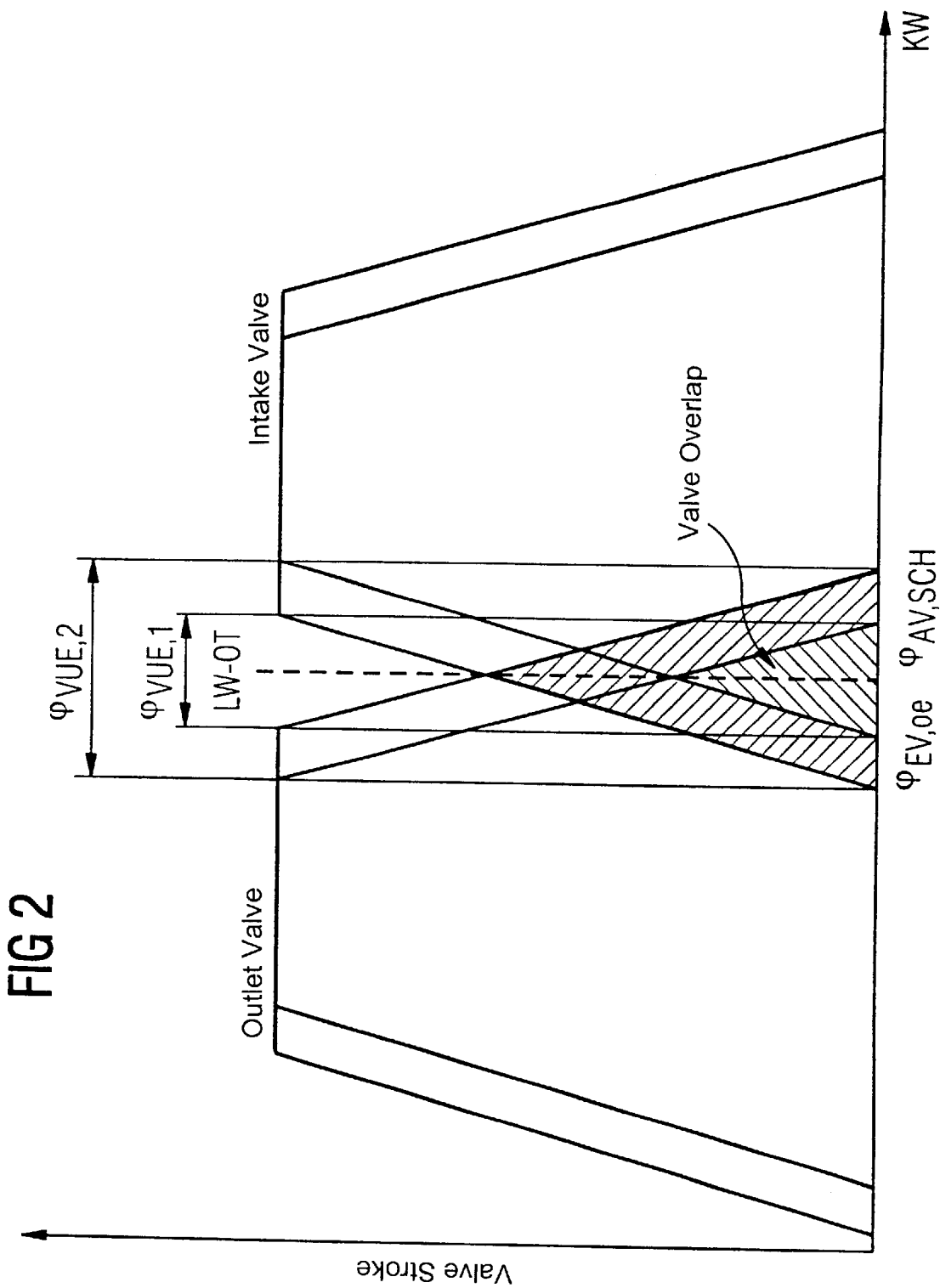
FIG. 2 is a graph showing a profile of a valve stroke, plotted against the crankshaft angle KW.

FIG. 2 shows a schematic illustration of the valve stroke of the outlet valve 31 and the inlet valve 30 for two different control times of the inlet and outlet valves, plotted against the crankshaft angle KW. $\phi_{EV,oe}$ is the opening angle of the inlet valve 30, that is to say the crankshaft angle KW for which the inlet valve 30 starts to open. $\phi_{AV,SCH}$ is the closing angle of the outlet valve 31, that is to say the crankshaft angle KW for which the outlet valve 31 is closed.

Figure 3:
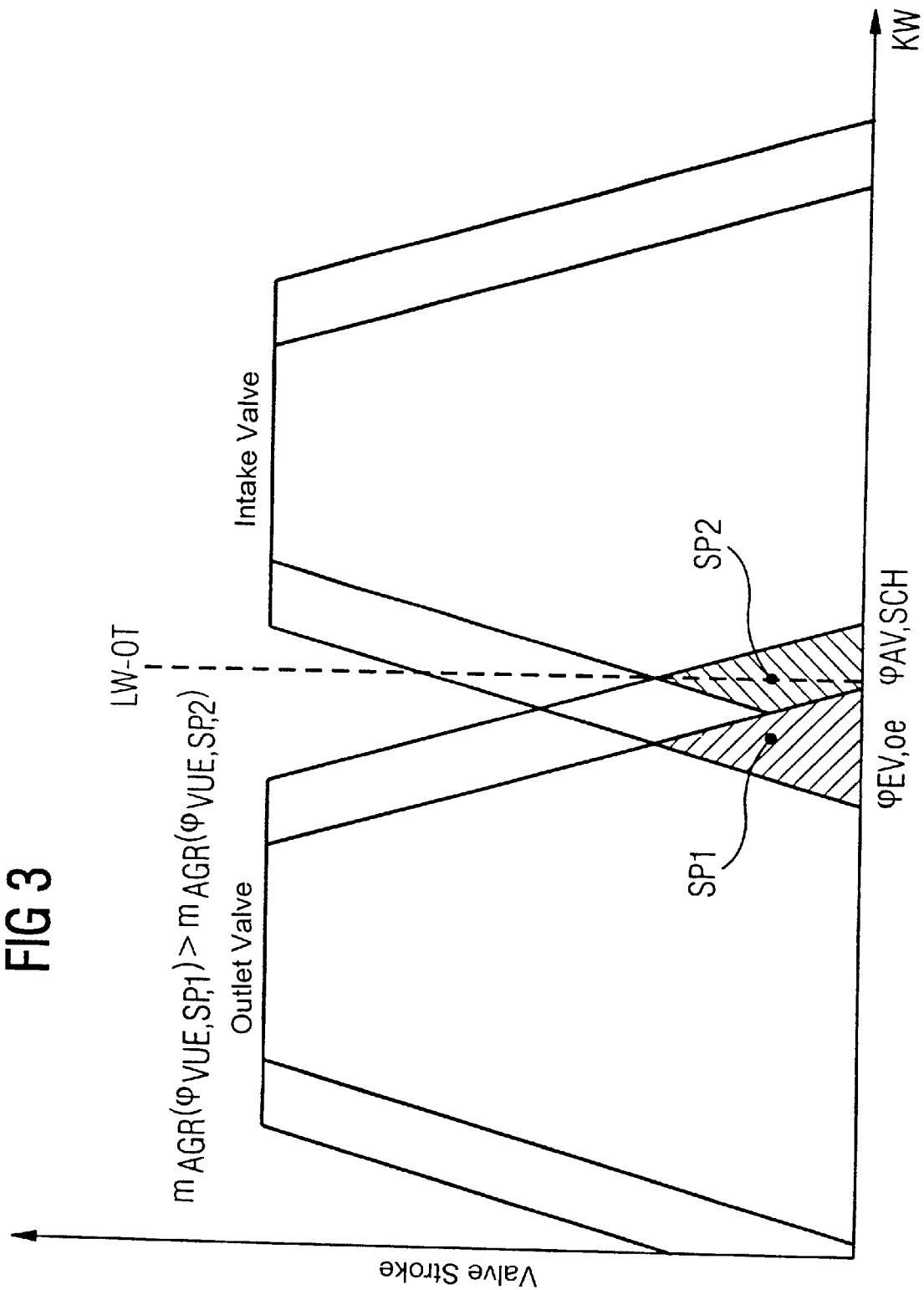
FIG. 3 is a graph showing a further profile of a valve stroke, plotted against the crankshaft angle KW.

LW-OT denotes the top dead center of the piston of the cylinder Z1 in the case of gas exchange. $\phi_{VUE,1}$ is a first value of the angle segment $\phi_{VUE}$ and $\phi_{VUE,2}$ is a second value of the angle segment $\phi_{VUE}$. In addition to the value of the angle segment $\phi_{VUE}$, the position of the angle segment $\phi_{VUE}$ referred to the top dead center LW-OT of the piston in the case of gas exchange is essential for the mass flow $\dot{m}_{AGR}$ resulting from internal exhaust gas recirculation. This is illustrated with the aid of FIG. 3. SP1 denotes the centroid in the case of a first example of the valve control times of the valve overlap, and SP2 denotes the centroid of the valve overlap for a second example of the valve control times. Since the center of gravity SP1 is situated before the top dead center LW-OT of the piston in the case of gas exchange, and the center of gravity SP2 coincides with the top dead center LW-OT, the exhaust gas mass $\dot{m}_{AGR}(\phi_{VUE,SP2})$ recirculated in the second case is smaller than the exhaust gas mass $\dot{m}_{AGR}(\phi_{VUE,SP1})$ recirculated in the first case.

The mass flow $\dot{m}_{AGR}$ resulting from internal exhaust gas recirculation is derived from the flow equation of ideal gases through throttle points. It holds that:

$$\dot{m}_{AGR} = A_{EV}\sqrt{\frac{2\kappa}{\kappa-1}\frac{1}{RT_{AG}}}\psi_{AG}p_{AG} \quad (F10)$$

where $$\sqrt{\left(\frac{p_{AG}}{p_{S,i}}\right)^{\frac{2}{\kappa}} - \left(\frac{p_{AG}}{p_{S,i}}\right)^{\frac{\kappa+1}{\kappa}}} \quad (F11)$$

for subcritical pressure ratios, and $$\sqrt{p_{q,krit}^{\frac{2}{\kappa}} - p_{q,krit}^{\frac{\kappa+1}{\kappa}}} \quad (F12)$$

for supercritical pressure ratios, $A_{EV}$ being the flow cross section at the inlet valve 30, $T_{AG}$ being the exhaust gas temperature, $p_{AG}$ being the exhaust gas pressure in the cylinder Z1 during the valve overlap, and $\phi_{AG}$ being the flow function at the inlet valve 30.

The free flow cross section $A_{EV}$ at the inlet valve 30 during the valve overlap is determined chiefly by the duration of the simultaneous opening of the inlet and outlet valves 30, 31. The larger the angle segment $\phi_{VUE}$ of the valve overlap, the larger is the flow cross section $A_{EV}$ at the inlet valve 30. In the case of an identical angle segment $\phi_{VUE}$ of the valve overlap, the recirculating exhaust gas mass is reduced by displacing a center of gravity angle $\phi_{VUE,SP}$ of the valve overlap surface (see FIG. 3), referred to the top dead center LW-OT in the direction of the exhaust gas tract.

The following relationship for the intake pipe pressure $p_s$ results from substituting the relationships (F5), (F8), (F9), (F10) in (F4) and setting $\Psi_{DK}=\Psi_{TEV}=\Psi$:

$$p_{s,i} = p_{s,i-1} + \frac{t_A}{2}\dot{p}_{s,i-1} +$$

$$\frac{t_A}{2}\frac{RT_{L,1}}{V_S}\left(A_{DK}\sqrt{\frac{2\kappa}{\kappa-1}\frac{1}{RT_{L,0}}}\psi p_0 + A_{TEV}\sqrt{\frac{2\kappa}{\kappa-1}\frac{1}{RT_{L,0}}}\psi p_0 - \dot{V}_{zyl}\frac{p_{s,i}}{RT_{L,1}} + A_{EV}\sqrt{\frac{2\kappa}{\kappa-1}\frac{1}{RT_{AG}}}\psi_{AG}p_{AG,i}\right)$$

Using the abbreviations $$C_0 = \frac{RT_{L,1}}{V_S} \tag{F14}$$

$$C_1 = \sqrt{\frac{2\kappa}{\kappa-1}\frac{1}{RT_{L,0}}}\,p_0 \tag{F15}$$

$$C_2 = \frac{1}{RT_{L,1}} \tag{F16}$$

$$C_3 = \sqrt{\frac{2\kappa}{\kappa-1}\frac{1}{RT_{AG}}} \tag{F17}$$

results in:

$$p_{s,i} = p_{s,i-1} + \frac{t_A}{2}\dot{p}_{s,i-1} + \tag{F18}$$

$$\frac{t_A}{2}C_0\left((A_{DK}+A_{TEV})C_1\psi - \dot{V}_{zyl}C_2 p_{s,i} + A_{EV}C_3\psi_{AG}p_{AG,i}\right)$$

Solving (F18) for the intake pipe pressure $p_s$ results in the recursive model equation:

$$p_{s,i} = \frac{p_{s,i-1} + \frac{t_A}{2}\dot{p}_{s,i-1}\frac{t_A}{2}C_0(C_1\psi(A_{DK}+A_{TEV})+A_{EV}C_3\psi_{AG})}{1+\frac{t_A}{2}\dot{V}_{zyl}/V_S} \tag{F19}$$

It can be written approximately for the time derivative $\dot{p}_s$ of the intake pipe pressure that $$\dot{p}_{s,i-1} = p_{s,i-1} - p_{s,i-1} \tag{F20}$$

Figure 4:
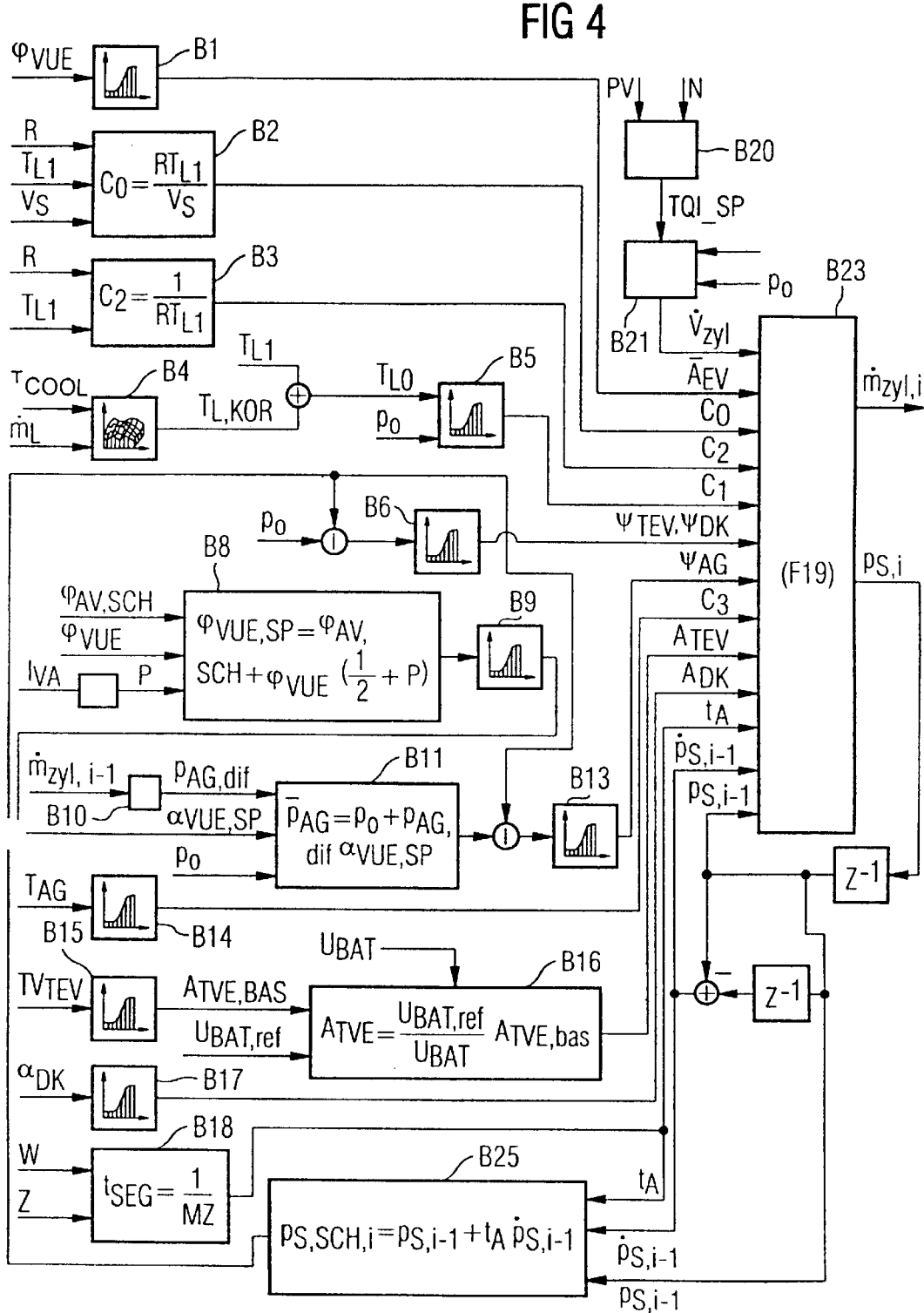
FIG. 4 is a schematic block diagram of a dynamic model of the internal combustion engine.

A block diagram is illustrated in FIG. 4 for the purpose of determining the intake pipe pressure $p_s$ and the gas mass flow $\dot{m}_{zyl}$ in the cylinder by means of the model of the internal combustion engine. An appropriate program is stored in the control device 6 and is processed there. A mean flow cross section $\overline{A}_{EV}$ at the inlet valve 30 during the valve overlap is determined in a block B1 from a characteristic diagram as a function of the angle segment $\phi_{VUE}$ of the valve overlap, which is prescribed. The characteristic diagram is determined in advance by measurements on an engine test-bed. Thus, the mean flow cross section $\overline{A}_{EV}$ can be determined easily, since the angle segment $\phi_{VUE}$ of the valve overlap is prescribed. The value $C_0$ is determined in a block B2 in accordance with the relationship (F14) as a function of the universal gas constant R, the temperature $T_{L1}$ of the gas mixture taken in by the cylinder, and the volume $V_s$ of the intake tract 1 upstream of the throttle valve 14. The value $C_2$ in accordance with the relationship (F16) is determined in a block B3 as a function of the universal gas constant and the temperature $T_{L1}$ of the gas mixture taken in by the cylinder.

Provided in a block B4 is a characteristic diagram from which a correction temperature $T_{L,Kor}$ is determined, specifically as a function of the coolant temperature $T_{cool}$ and the air mass flow $\dot{m}_L$ at the air mass meter 17. The characteristic diagram of the block B4 is determined in this case by measurements on an engine test-bed such that the sum of the correction temperature $T_{L,Kor}$ and the temperature $T_{L1}$ of the gas mixture taken in by the cylinder Z1 yields the intake air temperature $T_{L0}$ in the region of the throttle valve 14.

The value $C_1$ is determined in a block B5 from a characteristic diagram, as a function of the intake air temperature $T_{L0}$ and an ambient pressure $p_0$, which either is present as measured value of an ambient pressure sensor, or which is determined in the prescribed operating states—for example, with the throttle valve 14 completely open—from the intake pipe pressure $p_s$. The relationship (F15) is illustrated in the characteristic diagram of the block B5.

The flow function $\Psi$, which is equal to the flow functions $\psi_{DK}$ and $\psi_{TEV}$ at the throttle valve 14 and the tank ventilation valve 55, is determined in a block B6 from a characteristic line, specifically as a function of the ambient pressure $p_0$ and the ratio of an approximate value $p_{S,SCH,i}$ of the intake pipe pressure $p_s$ of the current calculating cycle, which will be explained in more detail further below.

The relationship (F6) is replaced in the block B6 by an appropriate characteristic line.

Instead of an exhaust gas pressure $p_{AG}$, a mean exhaust gas pressure $\overline{p}_{AG}$ during the valve overlap is determined, in order to save computing time thereby. The mean exhaust gas pressure $\overline{p}_{AG}$ is yielded from the following relationship:

$$\overline{p}_{AG} = p_0 + p_{AG,dif} \alpha_{VUE,SP} \tag{F21}$$

The differential pressure $p_{AG,Dif}$ is taken from a characteristic line in which values of the differential pressure $p_{AG,Dif}$ from the combustion of the air/fuel mixture in the cylinder are plotted as a function of the gas mass flow $\dot{n}_{zyl}$ into the cylinder Z1 calculated in the preceding calculating cycle. A correction factor $\alpha_{VUE,SP}$ is provided for correcting the mean exhaust gas pressure $\overline{p}_{AG}$ in the cylinder Z1 during the valve overlap as a function of a center of gravity angle $\phi_{VUE,SP}$ of the valve overlap.

The center of gravity angle $\phi_{VUE,SP}$ of the valve overlap is determined in a block B8 as a function of a closing angle $\phi_{AV,SCH}$ of the outlet valve 31, the angle segment $\phi_{VUE}$ of the valve overlap and a correction value P. The closing angle $\phi_{AV,SCH}$ is the angle referred to the crankshaft angle KW for which the outlet valve 31 is just closed. The correction value P can simply be prescribed as fixed, or else determined as a function of a variable influencing the closing rate of the inlet or outlet valves and which is preferably a current $I_{VA}$ through the valve mechanism. This takes account of the fact that the closing or opening rates of the outlet or inlet valves is substantially influenced as a function of the amplitude of the current $I_{VA}$ through the valve mechanism 31, 33. The center of gravity angle $\phi_{VUE,SP}$ is determined in the block B8 with the aid of the relationship (F23), which is specified below:

$$\varphi_{VUE,SP} = \varphi_{AV\cdot SCH} + \varphi_{VUE}\left(\frac{1}{2}+P\right) \tag{F23}$$

The relationship (F23) is viewed on the assumption that the valve strokes of the inlet valve 30 and the outlet valve 31 when plotted against the crankshaft angle during the valve overlap form a triangle and, applying the formula to the calculation of the centroid of a triangle, the ray theorem, the assumption that the rates of movement of the inlet and outlet valves 30 or 31 are known and are at a fixed ratio to one another. The center of gravity angle $\phi_{VUE,SP}$ of the valve overlap can therefore be determined precisely in the block B8 with a low computational outlay.

The correction factor $\alpha_{VUE,SP}$ is then determined in a block B9 from a characteristic diagram. The differential pressure $p_{AG,Dif}$ is determined in a block B10 as a function of the gas mass flow $\dot{m}_{zyl,i-1}$ of the last calculated cycle. Thus, a sufficiently accurate estimated value of the exhaust gas pressure effected by the combustion of the air/fuel mixture in the cylinder is determined with low computational outlay.

The mean exhaust gas pressure $\bar{p}_{AG}$ in the cylinder Z1 during the valve overlap is then determined in a block B11 in accordance with the relationship (F21). The relationship (F11) is plotted on a characteristic line in a block B13 as a function of the ratio of the mean exhaust gas pressure $\bar{p}_{AG}$ and the approximate value $p_{S,CH,i}$ of the intake pipe pressure $p_s$ of the current calculating cycle. The flow function $\psi_{AG}$ at the inlet valve 30 is therefore determined in the block B13.

The value $C_3$ is determined in a block B14 in accordance with the relationship (F17) as a function of an exhaust gas temperature $T_{AG}$. In order to determine the exhaust gas temperature $T_{AG}$, either a temperature sensor is provided in the exhaust gas tract, or an estimated value of the exhaust gas temperature $T_{AG}$ is determined as a function of the gas mass flow $\dot{m}_{zyl1}$, determined in the last calculating cycle, in the cylinder Z1.

A base flow cross section $A_{TEV,bas}$ at the tank ventilation valve 55 is determined in a block B15 from a characteristic diagram. A flow cross section $A_{TVE}$ at the tank ventilation valve 55 is then determined in a block B16 as a function of the base flow cross section $A_{TVE,bas}$ at the tank ventilation valve 55, a vehicle network voltage $U_{BAT}$ and a reference value $U_{BAT,ref}$ of the vehicle network voltage $U_{BAT}$, specifically in accordance with a relationship $$A_{TVE} = \frac{U_{BAT,ref}}{U_{BAT}} A_{TVE,bas} \qquad (F24)$$

Thus, the flow cross section $A_{TVE}$ at the tank ventilation valve 55 is determined very precisely in the block B16, since it depends strongly on the actual vehicle network voltage $U_{BAT}$. The basis flow cross section $A_{TVE,bas}$ is determined for the reference value $U_{BAT,ref}$ of the vehicle network voltage $U_{BAT}$.

The flow cross section $A_{DK}$ at the throttle valve 14 is determined from a characteristic line in a block B17 as a function of the degree of opening $\alpha_{DK}$.

A segment time duration $t_{seg}$ is determined in a block B18 as a function of the current speed N and the number Z of the cylinders of the internal combustion engine in accordance with the relationship (F3). The sampling time $t_A$ is equated to the segment time duration $t_{SEG}$, and thereby determines the calculating cycle.

A variable representing the load on the internal combustion engine is determined in a block B20. This variable is preferably a desired value TQI_SP of the torque, which is determined as a function of the gas pedal position PV and the speed and further torque requirements from engine operation functions or, for example, an electronic transmission control. A desired mass flow $\dot{V}_{zyl}$ into the cylinder Z1 is determined in a block B21 as a function of the ambient pressure $p_0$, the temperature $T_{L1}$ of the gas mixture taken in by the cylinder Z1 and the desired value TQI_SP of the torque.

The intake pipe pressure $p_s$ of the current calculating cycle is calculated in a block B23 using the formula in accordance with the relationship (F19), and the gas mass flow $\dot{m}_{zyl}$ into the cylinder Z1 is calculated using the formula in accordance with the relationship (F9).

An injection time, for example, is then calculated as a function of the gas mass flow $\dot{m}_{zyl,i}$, and appropriate drive signals for the injection valve 15 are generated by the control unit 6. A block B25 is provided in which the approximate value $p_{S,SCH,I}$ of the intake pipe pressure $p_S$ is calculated by means of a numerical integration method, for example the Euler method, from the intake pipe pressure $p_{S,i-1}$ of the preceding calculating cycle, from the time derivative $\dot{p}_{s,i-1}$ of the intake pipe pressure of the preceding calculating cycle, and from the sampling time $t_A$.

We claim:

1. A method of controlling an internal combustion engine in dependence on an exhaust gas pressure, the internal combustion engine including an intake tract, at least one cylinder, an exhaust gas tract, inlet and outlet valves disposed at the cylinder, and a crankshaft defining a crankshaft angle, the method which comprises:

determining an exhaust gas pressure in the cylinder during a valve overlap of the inlet and outlet valves that causes an internal exhaust gas recirculation in dependence on an estimated value of an exhaust gas pressure effected by a combustion of an air/fuel mixture in the cylinder, and a variable characterizing a centroid of the valve overlap of the inlet and outlet valves, and thereby defining the centroid with reference to a surface produced by the overlapping valve strokes of the inlet and outlet valves referred to a crankshaft angle.

2. The method according to claim 1, wherein the estimated value of the exhaust gas pressure effected by the combustion of the air/fuel mixture in the cylinder depends on a gas mass flow into the cylinder.

3. The method according to claim 1, wherein the variable characterizing the centroid of the valve overlap of the inlet and outlet valves is a center of gravity angle of the centroid of the valve overlap referred to the crankshaft angle.

4. The method according to claim 3, wherein the center of gravity angle is a function of a closing angle of the outlet valve, of an angle segment of the valve overlap and of a prescribed correction value.

5. The method according to claim 4, which comprises defining the correction value in dependence on a variable influencing a closing rate or an opening rate of the inlet or outlet valves.

6. The method according to claim 1, which comprises determining a mass flow resulting from internal exhaust gas recirculation as a function of the exhaust gas pressure and an intake pipe pressure in the in take tract.

7. The method according to claim 6, which comprises determining the mass flow resulting from internal exhaust gas recirculation as a function of a mean flow cross section at the inlet valve of the cylinder during the valve overlap.

8. The method according to claim 7, wherein the mean flow cross section is a function of the angle segment of the valve overlap.

9. The method according to claim 6, which comprises determining the mass flow into the cylinder with a dynamic model of the internal combustion engine as a function of the mass flow resulting from internal exhaust gas recirculation, and of at least the measured variables of the degree of opening of a throttle valve in the intake tract and of a speed of the crankshaft.

10. The method according to claim 1, wherein the exhaust gas pressure depends on an ambient pressure.

11. The method according to claim 1, which comprises respectively opening and closing the inlet and outlet valves with electromechanical servo-drives.

* * * * *